(12) United States Patent
Bose et al.

(10) Patent No.: US 9,690,599 B2
(45) Date of Patent: Jun. 27, 2017

(54) METHOD AND APPARATUS FOR DETERMINING AN ACTIVE INPUT AREA

(75) Inventors: Raja Bose, Mountain View, CA (US); Jörg Brakensiek, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 891 days.

(21) Appl. No.: 12/826,663

(22) Filed: Jun. 29, 2010

(65) Prior Publication Data

US 2011/0242122 A1    Oct. 6, 2011

Related U.S. Application Data

(60) Provisional application No. 61/224,348, filed on Jul. 9, 2009, provisional application No. 61/243,440, filed on Sep. 17, 2009.

(51) Int. Cl.

| | | |
|---|---|---|
| G09G 5/393 | (2006.01) | |
| G09G 5/00 | (2006.01) | |
| G06T 1/60 | (2006.01) | |
| G06F 9/44 | (2006.01) | |
| G06F 3/14 | (2006.01) | |
| G09G 5/08 | (2006.01) | |
| G09G 5/14 | (2006.01) | |

(52) U.S. Cl.
CPC .......... *G06F 9/4443* (2013.01); *G06F 3/1462* (2013.01); *G09G 5/08* (2013.01); *G09G 5/393* (2013.01); *G09G 5/14* (2013.01); *G09G 2310/04* (2013.01); *G09G 2340/14* (2013.01)

(58) Field of Classification Search
CPC .... G09G 5/393; G09G 5/001; G09G 2360/18; G06T 1/60; H04L 1/1874

USPC .......................... 345/530–545; 709/217–227
See application file for complete search history.

(56) References Cited

U.S. PATENT DOCUMENTS

| | | | |
|---|---|---|---|
| 5,107,251 | A | 4/1992 | Frank |
| 5,134,697 | A | 7/1992 | Scheffler |
| 5,473,343 | A | 12/1995 | Kimmich |

(Continued)

FOREIGN PATENT DOCUMENTS

| | | |
|---|---|---|
| CN | 101228515 A | 7/2008 |
| CN | 101309472 A | 11/2008 |

(Continued)

OTHER PUBLICATIONS

International Search Report and Written Opinion, received in corresponding Patent Cooperation Treaty Application No. PCT/IB2010/001602. Dated Oct. 15, 2010. 10 pages.

(Continued)

*Primary Examiner* — Matthew Salvucci
(74) *Attorney, Agent, or Firm* — Alston & Bird LLP

(57) ABSTRACT

Various methods for determining an active input area are provided. One example method includes acquiring frame buffer data defining an image area that has been refreshed and detecting a cursor within the frame buffer data. Detecting the cursor may include determining that dimensions of the image area match dimensions of a previously acquired image area associated with a successful cursor detection, and the example method may further include directing transmission of coordinates and dimensions of the image area to a remote environment. Similar and related example methods and example apparatuses are also provided.

24 Claims, 7 Drawing Sheets

(56) References Cited

U.S. PATENT DOCUMENTS

| | | | |
|---|---|---|---|
| 5,576,738 | A | 11/1996 | Anwyl |
| 5,898,422 | A | 4/1999 | Zetts |
| 6,486,869 | B1 | 11/2002 | Nakano |
| 6,774,886 | B2 | 8/2004 | Okuda |
| 2003/0107579 | A1* | 6/2003 | Willis et al. .................. 345/545 |
| 2004/0135788 | A1* | 7/2004 | Davidson et al. ............ 345/530 |
| 2004/0227739 | A1* | 11/2004 | Tani et al. ..................... 345/173 |
| 2007/0288640 | A1* | 12/2007 | Schmieder ..................... 709/227 |
| 2008/0141120 | A1 | 6/2008 | White et al. |
| 2008/0291210 | A1 | 11/2008 | Partani et al. |
| 2008/0297525 | A1 | 12/2008 | Rai |
| 2009/0097752 | A1 | 4/2009 | Yokoyama |
| 2010/0201617 | A1 | 8/2010 | Chiu et al. |

FOREIGN PATENT DOCUMENTS

| | | |
|---|---|---|
| GB | 2235355 A | 2/1991 |
| WO | WO 92/01281 A1 | 1/1992 |

OTHER PUBLICATIONS

European Search Report for Application No. 10 76 9785.3, dated Nov. 7, 2012.

International Search Report and Written Opinion for Application No. PCT/IB2010/001601 dated Dec. 21, 2010, 19 pages.

Communication from European Patent Office for Application No. PCT/IB2010001602, dated Jan. 25, 2013.

Office Action for Chinese Application No. 201080040519.2 dated Oct. 20, 2014.

Office Action for Chinese Application No. 201080040519.2 dated Apr. 27, 2015.

Office Action for European Application No. 10 796 786.1 dated May 29, 2015.

Office Action for corresponding European Application No. 10 796 786.1 dated May 29, 2015.

Office Action for European Application No. 10 796 786.1 dated Mar. 9, 2016.

* cited by examiner $b_{1C} = \{(1,3), (2,3), (3,3), (4,3), (5,3)\}$ $b_{1B} = \{(1,1), (2,1), (3,1), (4,1), (5,1),$
$\qquad (1,2), (2,2), (3,2), (4,2), (5,2),$
$\qquad (1,4), (2,4), (3,4), (4,4), (5,4),$
$\qquad (1,5), (2,5), (3,5), (4,5), (5,5)\}$

CURSOR IMAGE ———

COMPOSITE CURSOR ANIMATION

METHOD AND APPARATUS FOR DETERMINING AN ACTIVE INPUT AREA

RELATED APPLICATIONS

This application claims priority to U.S. Provisional Application No. 61/224,348 filed Jul. 9, 2009 and U.S. Provisional Application No. 61/243,440 filed Sep. 17, 2009, both of which are incorporated herein by reference in their entirety.

TECHNICAL FIELD

Embodiments of the present invention relate generally to mobile device interoperability with a remote environment or remote client, and, more particularly, relate to a method and apparatus for determining an active input area of an image via display frame buffer processing.

BACKGROUND

Mobile computing devices continue to evolve such that the computing devices are capable of supporting new and powerful applications. Examples include location and mapping technologies (e.g., via Global Positioning System (GPS)), media player technologies (e.g., audio and video), web browsing technologies, and the like.

As mobile computing devices increase in functionality, users demand the ability to interface with their mobile computing devices in a variety of ways. For example, considering again GPS capabilities, a user may wish to have a mobile computing device interface with a remote environment having a larger or more conveniently placed display in a vehicle, for interacting with maps and other location information. Similarly, a mobile computing device operating as a media player may also interface with a remote environment having a customized media player display, again possibly in a vehicle, to provide the user with an interface to the mobile computing device via a display located in the traditional location for a radio. The remote environment may be configured to display images provided by the mobile computing device, as well as receive input that can be forwarded back the mobile computing device for processing. For example, a remote environment may accept textual input via a keyboard, such as a touch screen keyboard. The textual input may be received and transmitted to the mobile computing device, and the mobile computing device may, in turn, provide for outputting the text to the display of the remote environment. Accordingly, a wide variety of applications, in any number of settings, can be implemented via a remote environment having, for example a larger display, such as in a vehicle, where a user may be interacting with the remote environment while the vehicle is moving.

BRIEF SUMMARY

Example methods and example apparatuses are described that provide for display frame buffer processing to determine the location of an active text input area (e.g., text box or text field) within an image to be provided to a remote environment. According to various example embodiments, an advantage of determining where the active text input area is located is that the area may be enlarged or highlighted a different color to assist users in quickly identifying the active text input area in situations where user cannot focus on, and interact with, the remote environment for an extended period of time, such as when a user is driving. Example embodiments of the present invention therefore identify the location of a cursor by processing frame buffer data provided by the mobile computing device to the remote environment, and possibly modify a visual attribute of the text input area associated with the location of the cursor to facilitate the ability of a user to quickly identify the location of the active text input area on the display of the remote environment.

Various example methods and apparatuses of the present invention are described herein, including example methods for determining an active input area. One example method includes acquiring frame buffer data defining an image area that has been refreshed, and detecting a cursor within the frame buffer data, wherein detecting the cursor includes determining that dimensions of the image area match dimensions of a previously acquired image area associated with a successful cursor detection. The example method further comprises directing transmission of coordinates and dimensions of the image area to a remote environment.

An additional example embodiment is an apparatus configured for determining an active input area. The example apparatus comprises at least one processor and at least one memory including computer program code. The at least one memory and the computer program code may be configured to, with the at least one processor, cause the example apparatus to perform various functionality. In this regard, the example apparatus is caused to perform acquiring frame buffer data defining an image area that has been refreshed, and detecting a cursor within the frame buffer data, wherein detecting the cursor includes determining that dimensions of the image area match dimensions of a previously acquired image area associated with a successful cursor detection. The example apparatus is further caused to perform directing transmission of coordinates and dimensions of the image area to a remote environment.

Another example embodiment is an example computer-readable storage medium having executable computer-readable program code instructions stored therein. The computer-readable program code instructions of the example computer-readable storage medium are for causing an apparatus to perform acquiring frame buffer data defining an image area that has been refreshed, and detecting a cursor within the frame buffer data, wherein the instructions for causing the apparatus to perform detecting the cursor include instructions for causing the apparatus to perform determining that dimensions of the image area match dimensions of a previously acquired image area associated with a successful cursor detection. The example computer-readable storage medium also includes instructions for causing an apparatus to perform directing transmission of coordinates and dimensions of the image area to a remote environment.

Another example embodiment is an apparatus for determining an active input area. The example apparatus includes means for acquiring frame buffer data defining an image area that has been refreshed, and detecting a cursor within the frame buffer data, wherein means for detecting the cursor include means for determining that dimensions of the image area match dimensions of a previously acquired image area associated with a successful cursor detection. The example apparatus also includes means for directing transmission of coordinates and dimensions of the image area to a remote environment.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
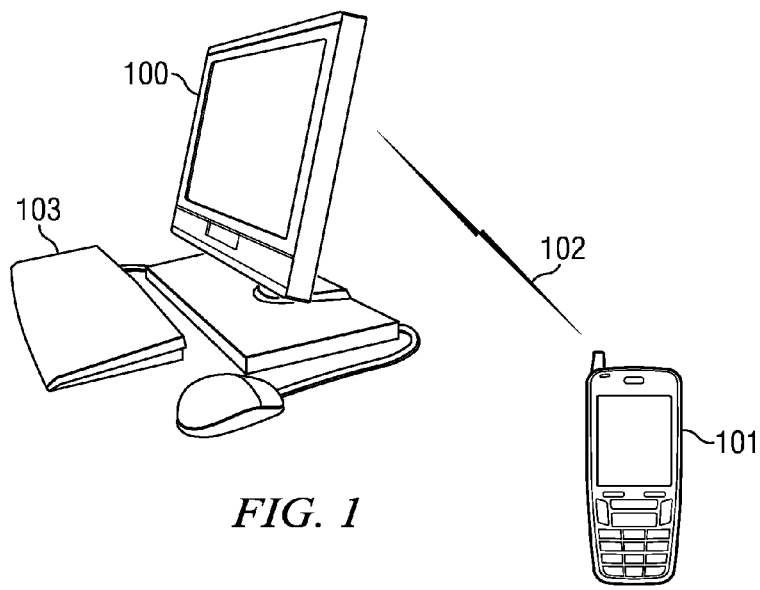
FIG. 1 illustrates a system for projecting a user interface to remote environment according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

FIG. 1 illustrates an example system in accordance with various example embodiments of the present invention. The example system includes a remote environment 100, User Equipment (UE) 101, and a communications link 102.

The remote environment 100 may be any type of computing device configured to display an image. According to some example embodiments, the remote environment 100 may include user interface components and functionality In this regard, keypad 103 may be an optional user input device. In some example embodiments, the remote environment 100 may include a touch screen display that is configured to receive input from a user via touch events with the display. Further, the remote environment 100 may include a keyboard, speakers, a microphone, and the like. The remote environment 100 may also include a communications interface for communicating with the UE 101 via the communications link 102.

The communications link 102 may be any type communications link capable of supporting communications between the remote environment 100 and the UE 101. According to some example embodiments, the communications link 102 is a Bluetooth link. While the communications link 102 is depicted as a wireless link, it is contemplated that the communications link 102 may be a wired link.

The UE 101 may be any type of mobile computing and communications device. According to some example embodiments, the UE 101 is a mobile terminal. The UE 101 may be configured to communicate with the remote environment 100 via the communications link 102. The UE 101 may also be configured to execute and implement applications via a processor and memory included within the UE 101.

According to some example embodiments, the UE 101 may be configured to, via the communications connection 102, direct the remote environment 100 to present an image and receive user input provided via the remote environment 100. The image presented by the remote environment 100 may be the same image that is being presented on a display of the UE 101, an image that would have been presented had the display of the UE 101 been active, or a modified image. For example, consider an example scenario where the remote environment 100 is installed in a vehicle as a vehicle head unit. The driver of the vehicle may wish to use the remote environment 100 as an interface to the UE 101 due, for example, to the convenient location of the remote environment 100 within the vehicle. The UE 101 may be configured to link with the remote environment 100, and direct the remote environment 100 to present images. The UE 101 may do so by scanning a display frame buffer of the UE 101 and providing frame buffer data to the remote environment 100 via the communications link 102. The display frame buffer maybe a portion of contiguous memory in the UE 101 that stores information about each pixel in the display screen. The size of the display frame buffer may be equal to the product of the screen resolution with the number of bits required to store data for each pixel.

The interaction between the UE 101 and the remote environment 100 provides an example of mobile device interoperability, which may also be referred to as smart space, remote environment, and remote client. In this regard, features and capabilities of the UE 101 may be projected onto an external environment (e.g., the remote environment 100), and the external environment may appear as if the features and capabilities are inherent to external environment such that the dependency on the UE 101 is not apparent to a user. Projecting the UE 101's features and capabilities may involve exporting the User Interface (UI) screen of the UE 101, as well as command and control to the external environment whereby, the user may comfortably interact with the external environment in lieu of the UE 101.

When the user interface of the UE 101 is exported to, for example, the remote environment 100, the UE 101 may periodically scan a display frame buffer to determine which portions of the UE 101's display have changed and communicate the changes to the remote environment 100. Due to the relatively low processing capabilities of many mobile communications devices (e.g., UE 101), and increasing display resolutions of displays (e.g., Quarter-High Definition (QHD) resolutions, Wide Video Graphics Array (WVGA) resolutions, etc.), the processing overhead associated with frame buffer analysis may be substantial, such that the execution of other applications on the UE 101 may be affected (e.g., slowed). In turn, the User Experience (UX) of accessing the UE 101's functionalities through the remote environment 100 may be diminished. Accordingly, reductions in the processing overhead associated frame buffer analysis and processing limit or avoid the negative impacts described above.

According to example embodiments of the present invention the computing overhead associated with frame buffer analysis and updating a display is reduced. In this regard, some example embodiments of the present invention utilize defined display regions and perform frame buffer analysis and processing with respect to the display regions, and not the entire display frame buffer data, at rates based upon the update criteria for the display regions. In this regard, each display region may have associated update criteria, and the update criteria may be selected such that the criteria is satisfied when a likelihood that the frame buffer data of a display region has changed. In this manner, scans of the frame buffer data associated with the display region at times when no changes to the content have occurred may be limited or avoided, thereby reducing computing overhead. According to various example embodiments, the display regions are sub-portions of the larger display, and the update criteria for the display regions may be selected such that an aggregate rate for scanning the frame buffer is reduced, thereby leading to higher quality of interaction between the remote environment 100 and the UE 101.

Figure 2:
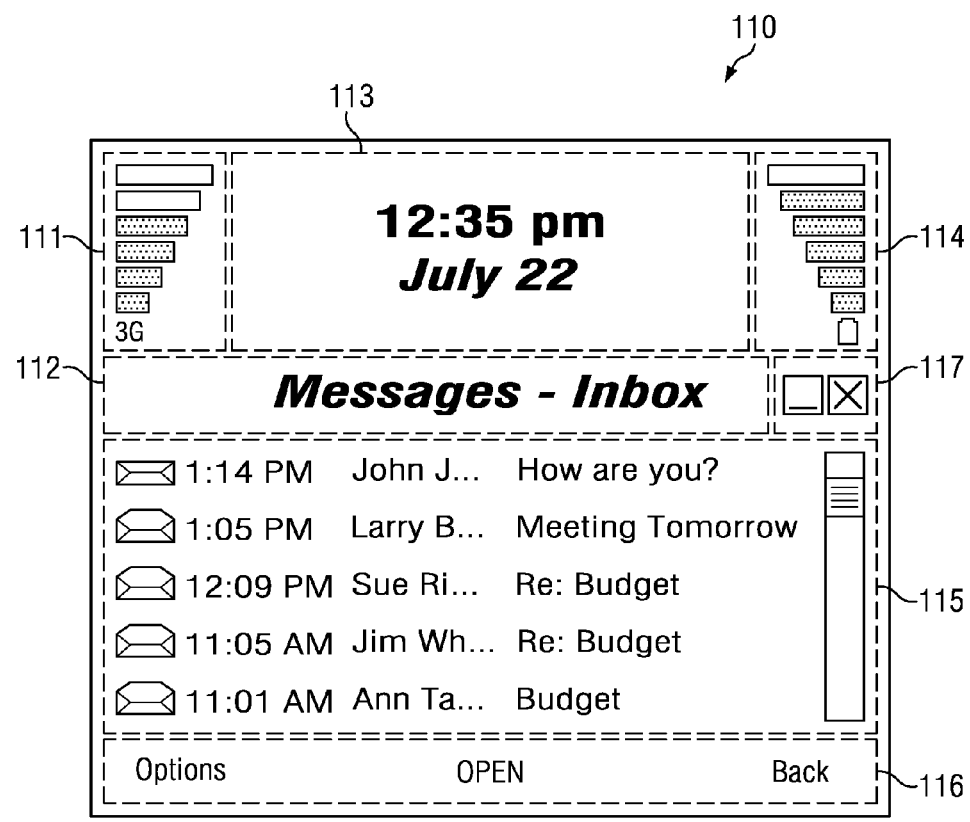
FIG. 2 illustrates an example user interface separated into display regions according to an example embodiment of the present invention.

FIG. 2 depicts an example display 110 having defined display regions. The display regions defined with respect to the example display 110 include a signal strength indicator region 111, a title bar region 112, a status information region 113, a battery indicator region 114, a content region 115, a soft key region 116, and a windows controls region 117. Based on the content that is depicted within each of these regions, associated update criteria may be selected.

In this regard, display regions may be defined (e.g., the area of the display associated with the display region may be defined) and the display regions may be classified according to the expected rate of change of the content within the display region and/or the triggering events that lead to changes in the content of the display region. Based on a classification of a display region, associated update criteria may be defined.

Some display regions may be classified as independently refreshed regions. Independently refreshed regions include display content that changes independently, regardless of user input events, changes to application contexts, or changes to the content of other regions. Examples of independently refreshed regions include the battery indicator region 112, the status information region 113, and, possibly the content region 115 (depending, for example, on the application that is being executed). According to some example embodiments, independently refreshed regions may have update criteria in the form of a timer threshold. In this regard, when a timer passes the threshold, the update criteria may be satisfied. Independently refreshed regions may be further classified as fast update regions and slow update regions. Differences in the timer threshold may be used to implement a fast update region versus a slow update region. Fast update regions display content that may change rapidly. For example, the signal strength indicator region 111 may change rapidly. Slow update regions display content that may change at a relatively slower pace. For example, the status information region 113 may change at a slower pace.

On the other hand, some display regions may be classified as triggered refresh regions. Triggered refresh regions may have content changes in response to events such as a user input, changes in application contexts (e.g., application launch or termination), or changes of content in another display region. Examples of triggered refresh regions include the title bar region 112, the soft key region 116, the windows controls region 117, and possibly the content region 115 (depending on the application that is being executed).

According to various example embodiments, area definitions associated with a display region (e.g., coordinates for the area associated with the display region) and the display region's classification or update criteria may be stored as meta-data in a platform independent format such as Extensible Markup Language (XML). In this regard, according to various example embodiments, each mobile device model, based on, for example, the screen size, resolution, and UI layout, may include a file or other data structure storing the meta-data associated the UI screens. Further, various applications installed on the device (e.g., UE 101) may have stored data for display region area definitions and update criteria. According to some example embodiments, display region data need not be stored for each UI screen, rather one record containing meta-data for display regions of the home screen UI, one record containing meta-data for regions of the menu screen UI, and one record containing meta-data of regions of all other UI screens (e.g., application screens, etc.) may be utilized.

Figure 3:
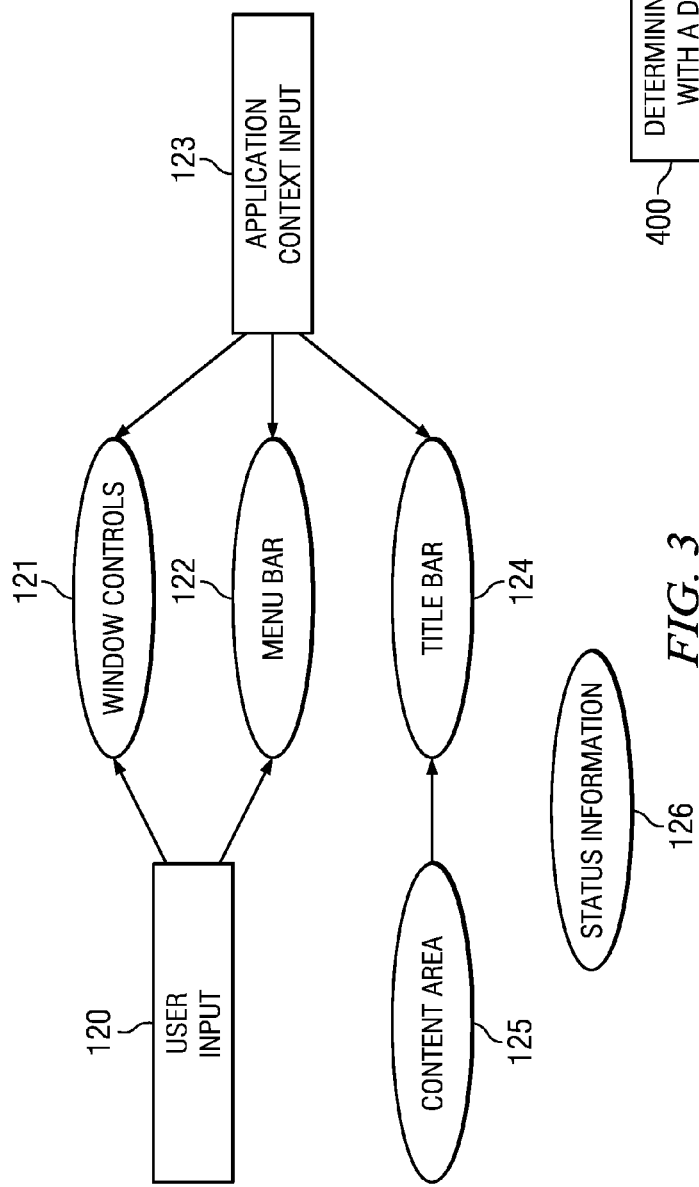
FIG. 3 illustrates a example dependency graph for display frame buffer processing according to an example embodiment of the present invention.

According to some example embodiments, update criteria for display regions may be stored in the form of a dependency graph. The dependency graph may provide information (e.g., criteria) regarding which display regions change in response to user input (e.g., key presses), changes in application contexts, and changes in the frame buffer data/content of other display regions. A dependency graph may be acyclic and consist of nodes. Each node within the dependency graph may represent a different display region. An example of a dependency graph is shown in FIG. 3. The dependency graph of FIG. 3 depicts the dependency graph for a general application screen of a Nokia N810 Internet Tablet.

To model update criteria that is satisfied when a change in another display region occurs, an edge may be directed from a triggering node to the triggered node. In this regard, consider a scenario where a directed edge exists from a node A to a node B. A change in the display region represented by node A may trigger a change in the display region represented by node B. As such, based on the associated dependency graph, the update criteria for the display region of node B may be satisfied when a change in the display region of node A occurs. With respect to FIG. 3, a change in the frame buffer data of the content area region 125 satisfies the update criteria for the title bar region 124.

With respect to display regions having update criteria based on changes in frame buffer data for a triggering display region, the frame buffer data for the triggered display region may be analyzed and compared when a change to the frame buffer data for the triggering display region occurs since the last update for the triggered display region. If changes to the frame buffer data are identified, the changes may be provided to the remote environment. If no user input has been detected, then the frame buffer data for the display region need not be analyzed. According to some example embodiments, regardless of whether user input has been received, the display region may be analyzed at a low frequency to avoid loss of synchronization.

To model update criteria that is satisfied when a user input occurs, a user input node may be defined. In this regard, a directed edge between a user input node X and a display region for node Y indicates that the detection of user input may satisfy the update criteria for the display region for node Y. Referring to FIG. 3, update criteria for a window controls region and a menu bar region may be satisfied by the occurrence of user input, as indicated by the edges from the user input node 120 to the window controls region node 121 and the menu bar region node 122.

With respect to display regions having update criteria based on user input, the frame buffer data for the display region may be analyzed and compared when a user input has been detected since the last update for the display region. If changes to the frame buffer data are identified, the changes may be provided to the remote environment. If no user input has been detected, then the frame buffer data for the display region need not be analyzed. According to some example embodiments, regardless of whether user input has been received, the display region may be analyzed at a low frequency to avoid loss of synchronization.

To model update criteria that is satisfied when a application context changes, an application context input node may be defined. In this regard, a directed edge between an application context input node X and a display region for node Y indicates that the detection of a change in application context may satisfy the update criteria for the display region for node Y. Also, referring to FIG. 3, update criteria for a window controls region, a menu bar region, and a title bar region may be satisfied by the occurrence of a change in an application context, as indicated by the edges from the application context input node 123 to the window controls region node 121, the menu bar region node 122, and the title bar node 124.

With respect to display regions having update criteria based on application context changes (e.g., application launch and/or application termination), the frame buffer data for the display region may be analyzed and compared when an application context change occurs since the last update for the display region. A change in the application context may be determined by interrogating or querying the underlying operation system (e.g., window manager component). If changes to the frame buffer data are identified, the changes may be provided to the remote display. If no application context change is identified, then the frame buffer data for the display region need not be analyzed. According to some example embodiments, regardless of whether user input has been received, the display region may be analyzed at a low frequency to avoid loss of synchronization.

To model update criteria for independently refreshed display regions, a disconnected node with no incoming edges may be provided. In this regard, independently refreshed display region nodes may have outgoing edges if changes to the frame buffer data for the display region satisfy update criteria for other display regions. Referring to FIG. 3, the content area node 125 and the status information node 126 are defined as being independently refreshed.

As independently refreshed display regions, the current frame buffer data for the associated display region may be compared to subsequent frame buffer data for the display region in response to the passing of a timer threshold. In this regard, an appropriate timer threshold may be set for fast update regions and slow update regions. When the timer threshold is passed, the frame buffer data may be compared and the changed portions may be provided to a remote environment.

Alternatively, more sophisticated update criteria may be utilized for independently refreshed display regions. In this regard, according to some example embodiments, the frame buffer data may be compared after a given number of frame changes, where the given number of frame changes may be defined based on processing load and/or a probabilistic rate of change in a display region's frame buffer data. Further, for a status information region that shows a clock, such as the status information region 113, analyzing the frame buffer data every 1800 iterations may be sufficient without any perceptible loss in user experience, assuming the iterations occur a rate of thirty per second (based on thirty frames per second). Further, according to various example embodiments, the update criteria (e.g., timer threshold) may also be determined autonomously, based on observations and learning a display region's temporal behavior, either in the beginning or at regular intervals, to determine the actual frequency of frame buffer data change.

Further, as indicated with respect to nodes 121, 122, and 124 of FIG. 3, two or more sets of update criteria may be used to trigger an analysis of frame buffer data for the associated display region. To avoid duplicate traversal of display regions during a single iteration, after each display region has been traversed, the corresponding node in the dependency graph may be marked (e.g., a flag for the display region may be set) indicating that the display region has already been analyzed. During a single iteration, a display region node that is marked need not be re-analyzed. The mark may then be cleared after the iteration.

Figure 4:
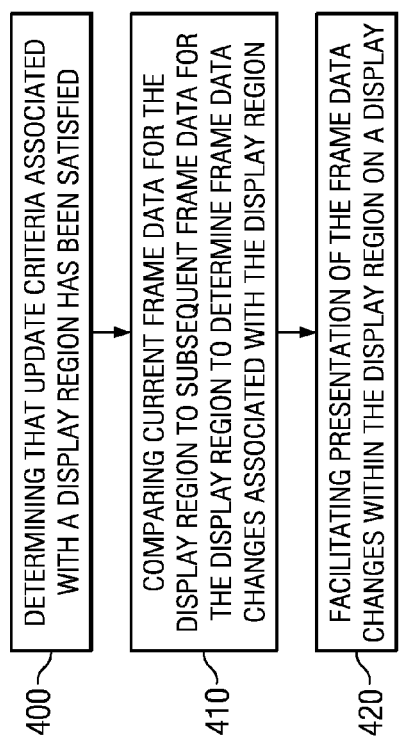
FIG. 4 illustrates flow charts of methods for display frame buffer processing according to various example embodiments of the present invention.

FIG. 4 depicts one or more flowcharts of example methods for display frame buffer processing. An example method includes determining that update criteria associated with a display region has been satisfied at 400. In this regard, the display region is less than an entire area of the display. The update criteria may take a number of forms and may be satisfied in a manner associated with the form. For example, according to some example embodiments, the update criteria for a display region may be satisfied when a timer threshold has been passed. Additionally, or alternatively, according to some example embodiments, the update criteria for a display region may be satisfied when user input has been received via a user interface. Additionally, or alternatively, according to some example embodiments, the update criteria for a display region may be satisfied when a context of an application associated with the current frame buffer data has changed. Additionally, or alternatively, according to some example embodiments, the update criteria for a display region may be satisfied when frame buffer data changes associated with another display region have occurred. According to some example embodiments, the update criteria and a description of an area of the display region may be stored as meta-data for an associated application.

An example method may also include comparing current frame buffer data for the display region to subsequent frame buffer data for the display region to determine frame buffer data changes associated with the display region at 410. In this regard, the comparing may be performed in response to the update criteria being satisfied. Further, according to some example embodiments, an example method may include facilitating presentation of the frame buffer data changes within the display region on a display or remote environment at 420.

In addition to analyzing the frame buffer data associated with display regions as described above, the frame buffer data may also be analyzed to determine the location of a cursor in an image provided to the remote environment (the projected image or projected UI), to thereby identify an active text input area. When the UI of the mobile device (e.g., UE 101) is exported to a remote environment, such as a remote terminal, vehicle head unit, or the like, the user utilizes input mechanisms available via the remote environment, and the input may be directed to the mobile device. In terms of input activities by a user, text input can often be one of the most involved activities, since text input often requires a longer attention span by the user and heightened degree of focus on the display. For example, when the remote environment is a vehicle head-unit, a user may wish to perform text input while briefly stopped at a stop light. As such, mechanisms for drawing a user's attention to the active area of the image may be desirable to a assist a user in quick and focused entry of text. In this regard, that active text input area may be highlighted or enlarged as compared to rest of the image, so that the user is able to quickly distinguish the active text input area from other screen clutter.

Various example embodiments of the present invention facilitate visually emphasizing the active text input area by first identifying the location of the active text input area by locating the cursor via analysis of frame buffer data specific to display regions where text input may potentially occur, and determining the screen co-ordinates where the cursor resides. The entire frame buffer need not be analyzed to lower processing load and increase speed and probability of cursor detection. For example in FIG. 2, only the frame buffer data corresponding to display region 115 may be analyzed for occurrence and position of a text cursor. In other words, according to various example embodiments, the entire display region where the cursor resides or a sub-section of the display region currently surrounding the cursor may be the active text input area. Thus, according to various example embodiments, detecting the current position of the cursor using the frame buffer data provides the information needed to identify the active text input area portion of the image (e.g., the display region) and provide the coordinates of the active input area portion of the image to the remote environment, to facilitate emphasizing the active text input area (e.g., by magnifying the area, changing the background color of the area, or the like) on the display of the remote environment so that the user can easily distinguish the active text input area from other screen clutter. Various example embodiments, provide for locating the cursor using, for example, software implementations executed on a mobile device that do not require changes to the hardware of either the mobile device or a remote environment, thereby providing for implementation in a variety of hardware environments. Further, identifying the location of the cursor, according to various example embodiments, is not dependent on the particular application being implemented and can be utilized in combination with any application involving text entry with a cursor. In other words, various example embodiments of the present invention are application agnostic.

Figure 5:
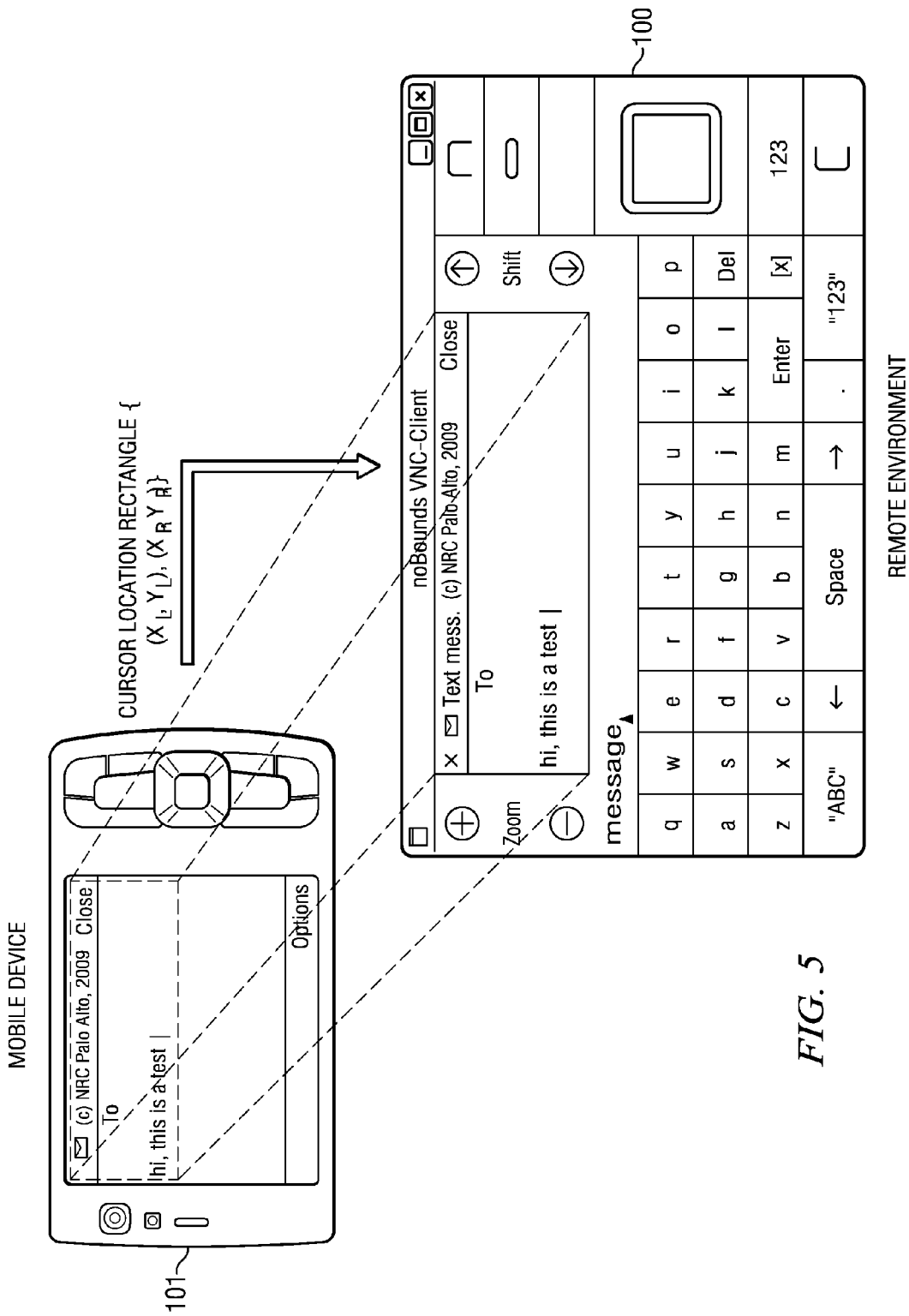
FIG. 5 illustrates an example projection of an active text input area to a remote environment according to an example embodiment of the present invention.

FIG. 5 depicts examples of the UE 101 (also referred to as a mobile device) and the remote environment 100. In this regard, FIG. 5 illustrates an example scenario where the cursor has been located and the active test input area has been determined based of the location of the cursor. The active text input area has been emphasized by, for example, eliminating other portions (e.g., display regions) of the image at the UE 101, and displaying the active text input to the user on the remote environment 100. Considering active text area taken from FIG. 5, it is noteworthy that the entire display region need not be designated the active text input area, rather, a subsection of the display region may be designated the active text area. In FIG. 5, according to various example embodiments, the display region containing the cursor in the UE 101 is the entire text form, whereas the active text area shown in the remote environment 100 is just the top half of the form/display region. According to some example embodiments, once the coordinates of the cursor have been determined via detection (as described further below), the active text input area may be determined, for example (but not limited to), as X pixels above the cursor, X pixels below the cursor and Y pixels to the left of the cursor and Y pixels to the right of the cursor.

Identifying the location of a cursor to facilitate identifying an active text input area may be implemented by analyzing frame buffer data. However, to reduce the processing overhead and reduce the likelihood of false positives, some example methods only analyze a portion of the frame buffer data. In this regard, example embodiments of the present invention only analyze display regions that have the potential to include the cursor, such as content area display regions as described above.

To identify the active text input area, some example embodiments distinguish frame buffer data associated with the text cursor from the rest of the frame buffer data (e.g., the rest of the frame buffer data associated with a particular display region, such as the content area display region). In this regard, the trigger for performing a cursor detection iteration (as further described below) to identify the location of the cursor may be the occurrence of a frame buffer update of the frame buffer data associated with the display region to be analyzed. According to some example embodiments, performance of a cursor detection iteration to identify the location of the cursor may be performed each time updated frame buffer data is provided to the remote environment. In this regard, the frame buffer data update may be transmitted by the mobile device to the remote environment either periodically (push) or as requested by the remote environment (pull).

Figure 6:
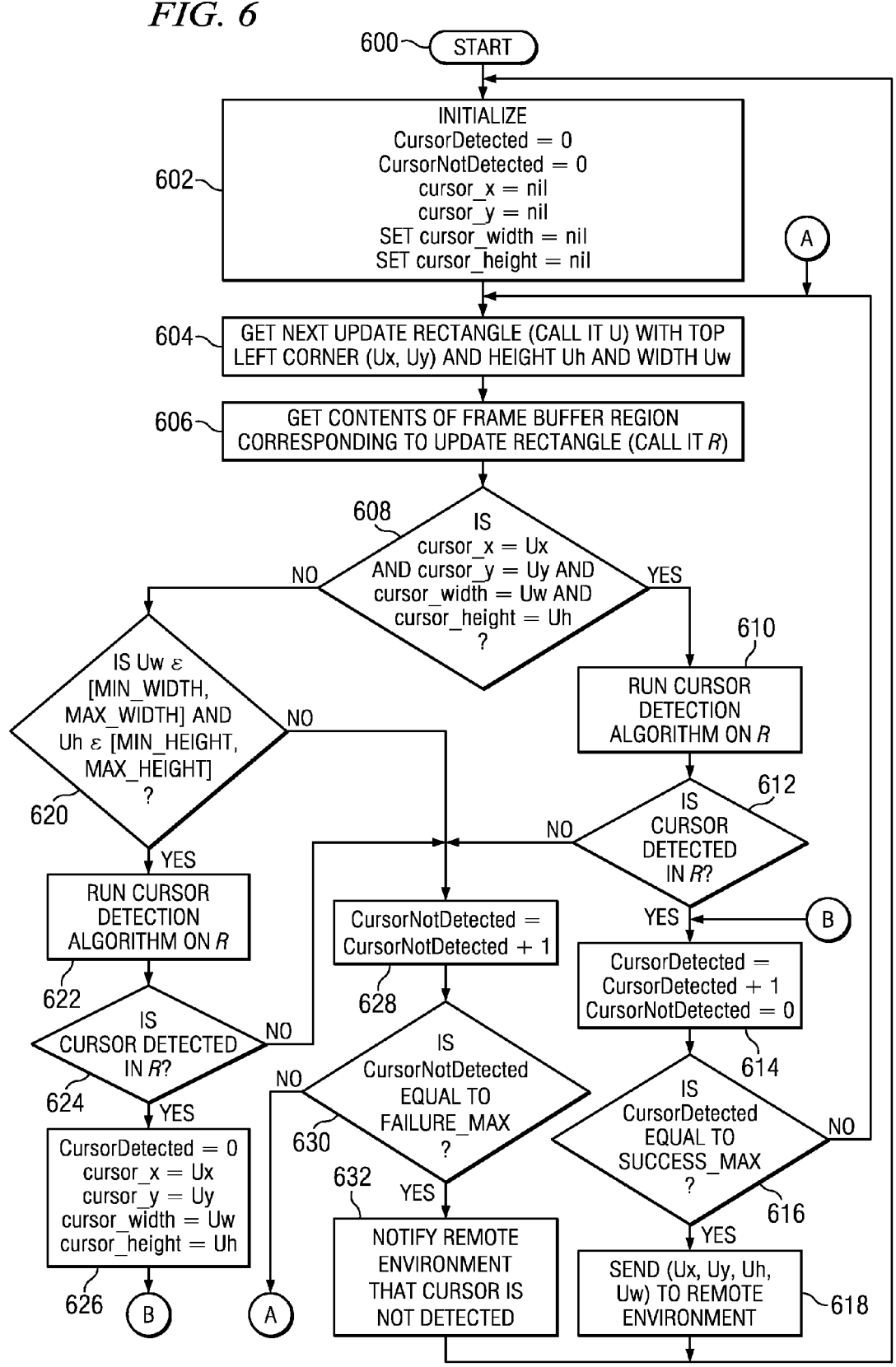
FIG. 6 illustrates a flow chart of an example method for detecting the location of a cursor according to an example embodiment of the present invention.

FIG. 6 illustrates a flow chart of an example method for identifying and providing the location of a cursor in accordance with some example embodiments of the present invention. As described above, frame buffer data may be analyzed to locate the cursor. Frame buffer data associated with rectangles defined by display regions that have been refreshed may be analyzed to detect the cursor. To make a determination that the location of a cursor has been verified or that an expected location of the cursor is incorrect, a number of iterations of cursor detection may be performed. For successful iterations at the same location, a success counter (CursorDetected) may be incremented, and when the success counter reaches a threshold success value (SUCCESS_MAX), the location of a cursor has been verified. Accordingly, as a result of the verification, the location and size of the cursor may be provided. Similarly for failed iterations, a failure counter (CursorNotDetected) may be incremented, and when the failure counter reaches a threshold failure value (FAILURE_MAX), a cursor detection has failed. Accordingly, a failure notification may be provided when a cursor detection has failed. The threshold success value and the threshold failure value may be defined based on how fast the cursor is updated with respect to the rest of the display. For example, if the cursor flashes or changes slowly and the background is a rapidly changing background, then threshold failure value may be comparatively higher than threshold success value. Alternatively, for fast flashing or changing cursors, the threshold success value may be set to a relatively lower value (perhaps equal to 1), since the location of the cursor changes rapidly.

Additionally, since the size of a cursor may change depending on the application or UI context being implemented at the time, ranges for the potential cursor height and width may be defined. In this regard, a minimum height (MIN_HEIGHT), a maximum height (MAX_HEIGHT), a minimum width (MIN_WIDTH), and a maximum width (MAX_WIDTH) may be defined.

Referring now to the specific operations of FIG. 6, the example method may begin at 600 and an initialization of location and size tracking variables and counters may be implemented at 602. In this regard, cursor location and size variables (e.g., cursor_x, cursor_y, cursor_width, and cursor_height) may be set to nil, and the success and failure counters (CursorDetected and CursorNotDetected) may be zeroed. The variables cursor_x and cursor_y may indicate the last known X and Y coordinate position of the cursor, respectively. Similarly, the cursor_width and cursor_height variables may indicate the last known width and height of the cursor, respectively.

At 604, a prospective cursor rectangle may be determined. For explanation purposes, the prospective cursor rectangle may be referred to as "U", where (Ux,Uy) denotes the coordinates of the top left corner, and Uw and Uh denote the width and height of the rectangle, respectively. According to various example embodiments, the location and size of prospective cursor rectangle may be determined through various means such as, but not limited to registering with a display driver to receive refresh notifications, or by comparing the current frame buffer data (or the current frame buffer data associated with a select display region) to previous frame buffer data to identify distinctions.

At 606, frame buffer data may be acquired that corresponds to the location and size of the prospective cursor rectangle. For explanation purposes, the frame buffer data associated with the cursor rectangle may be referred to as "R". R may be a monochrome or color bitmap corresponding to a portion of the mobile device display which has been updated. According to various example embodiments, the acquired frame buffer data for the prospective updated cursor rectangle may be acquired from a portion of the data in the frame buffer that associated with an updated content area display region.

At 608, the location and size of the prospective cursor rectangle may be compared to the previous location and size of a prior successful cursor rectangle to determine if a match is identified, thereby indicating that the cursor is still at the same location and the cursor is the same size. In other words, cursor_x may be compared to Ux, cursor_y may be compared to Uy, cursor_width may be compared to Uw, and cursor_height may be compared to Uh. If matches are identified, a cursor detection algorithm may be performed at 610 (further described below) and a result (e.g., true or false) may be obtained.

At 612, the result of the cursor detection algorithm may be tested, and if a cursor was detected, the success counter may be incremented (CursorDetected=CursorDetected+1) and the failure counter may be zeroed (CursorNotDetected=0) at 614. At 616, the success counter may be compared to the threshold success value to determine if the threshold success value has been met or exceeded. If the threshold has been met or exceeded, then the prospective cursor rectangle has been verified as being an actual cursor rectangle and the location and size of the actual cursor rectangle (e.g., Ux, Uy, Uh, and Uw) may be provided, for example, to the remote environment at 618. According to some example embodiments, the remote environment may be configured to determine, via a processor and memory, the active text input area based on the location and size of the actual cursor rectangle. Further, depending on the UI context and the display capabilities of the remote environment, the remote environment may determine the size and/or color of the active text input area. For example, if the remote environment includes a display that is relatively large, the remote environment may display the active text input area with larger dimensions.

Subsequent to providing the location and size at 618, the variables may be once again initialized at 602 and the example method may continue. In the event that the success counter has not reached the threshold success value, a new prospective cursor rectangle may be determined at 604 and the example method may continue.

At 612, if the result of the cursor detection algorithm is false or a cursor has not been detected, the failure counter may be incremented (CursorNotDetected=CursorNotDetected+1) at 628. Subsequently at 630, a determination may be made as to whether the failure counter has reached or exceeded the threshold failure value. If the threshold failure value has not been reached or exceeded, a new prospective cursor rectangle may be determined at 604 and the example method may continue. If the threshold failure value has been reached or exceeded, a notification that a cursor has not been detected may be provided to the remote environment at 632, and subsequently, the variables may be once again initialized at 602 and the example method may continue.

At 608, if the location and size of the prospective cursor rectangle do not match the previous location and size of the prior successful cursor rectangle, then a determination may be made at 620 as to whether the height and width of the prospective cursor rectangle are with the ranges of potential cursor heights and widths. In other words, whether Uh falls within MIN_HEIGHT and MAX_HEIGHT may be determined, and whether Uw falls within MIN_WIDTH and MAX_WIDTH may be determined. The height and width do not fall within the ranges at 620, the failure counter may be incremented at 628 and the example method may continue. If the height and width fall within the ranges at 620, a cursor detection algorithm may be performed (further described below) at 622, and a result (e.g., true or false) may be obtained.

At 624, the result of the cursor detection algorithm may be tested, and if a cursor was not detected (e.g., returned false), the failure counter may be incremented at 628 and the example method may continue. If a cursor was detected (e.g., returned true), the prospective cursor rectangle has been verified to be an actual cursor rectangle. As a result, the success counter may be zeroed (CursorDetected=0) and the location and size variables may be set to the location and size of the now verified actual cursor rectangle (e.g., cursor_x=Ux, cursor_y=Uy, cursor_width=Uw, and cursor_height=Uh) at 626. Subsequently, the success counter may be incremented (CursorDetected=CursorDetected+ 1) and the failure counter may be zeroed (CursorNotDetected=0) at 614, and the example method may continue.

Note that, according to some example embodiments, the example method described with respect to FIG. 6 need not rely upon any support from the UI frame work. However, in accordance with some example embodiments, a method may be implemented that involves receiving notifications from a UI framework whenever a text input area (e.g., box, window, or field) is displayed on the mobile device screen. These notifications may ensure that the cursor detection algorithms described below may be executed when there is a text input area on-screen, and not otherwise.

Operations 610 and 622 of FIG. 6 reference performing a cursor detection algorithm. The following provides descriptions of a few example cursor detection algorithms.

A first example cursor detection algorithm that may be implemented at operation 610 or 622 is defined for a simple rectangular flashing cursor. Since the other operations of the method of FIG. 6 inherently consider a situation with a rectangular flashing cursor, the first cursor detection algorithm may simply return a true result.

A second example cursor detection algorithm for more advanced cursors utilizes a cursor template including a number of cursor bitmaps for detecting a cursor. A more advanced cursor may be one that has a plurality of visible states, patterns, or shapes. The second example cursor detection algorithm may also be implemented for rectangular flashing cursors.

With respect to the second example cursor detection algorithm, a cursor template may be defined, which provides the criteria needed to detect a cursor. An example text cursor template may be denoted by $T=\{b_1, b_2, b_3, b_4 \ldots b_Y\}$ where Y is the number of visible states of the cursor, and $b_i$ is the i-th state of the cursor and is representative of a bitmap depicting the visual state of the cursor. The cursor represented by template T may loop though a series of states according to the following state transitions $b_1 \rightarrow b_2 \rightarrow b_3 \rightarrow b_4 \ldots \rightarrow b_Y$ (loop back to $b_1$).

Figure 7A:
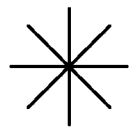
FIG. 7a illustrates an example cursor template according to an example embodiment of the present invention.

With reference to FIG. 7a depicting an example cursor template, each cursor bitmap may include an m×n rectangular grid, where "m" is the width of the rectangular area for the cursor, and "n" is the height of the rectangular area for the cursor. Each cell (e.g., pixel) in the grid may be marked as "C" to denote that the cell is part of the foreground cursor image, or "B" to denote that the cell is part of the background cursor image. According to various example embodiments, cells marked "B" have a different color value than cells marked "C". As a result, the cursor in a visible state, with a foreground component, may have a contrasting color compared to the background component. A cursor bitmap may be stored as a union of two sets, $b_C$ and $b_B$, where $b_C$ is a set of 2-tuples (x,y) where (x,y) represents the position in the grid of a cell which is marked "C" and $b_B$ is a set of 2-tuples (x,y) where (x,y) represents the position in the grid of a cell which is marked "B". Accordingly, b may equal $b_C \cup b_B$.

While the color values for the foreground and background may be predicted, various example embodiments of the present invention do not require that colors of the foreground and background be known. Rather, the mere presence of a difference in color between the foreground and background may be used. As such, according to various example embodiments, unpredictable changes to the background color or non-uniform backgrounds do not detrimentally affect the outcome of the cursor detection algorithm. As a result, according to various example embodiments, situations where an application changes the background to a non-default color/pattern, and the UI framework has to correspondingly change the cursor color to maintain a visible contrast, do not detrimentally affect the results of the algorithm.

Figure 7B:
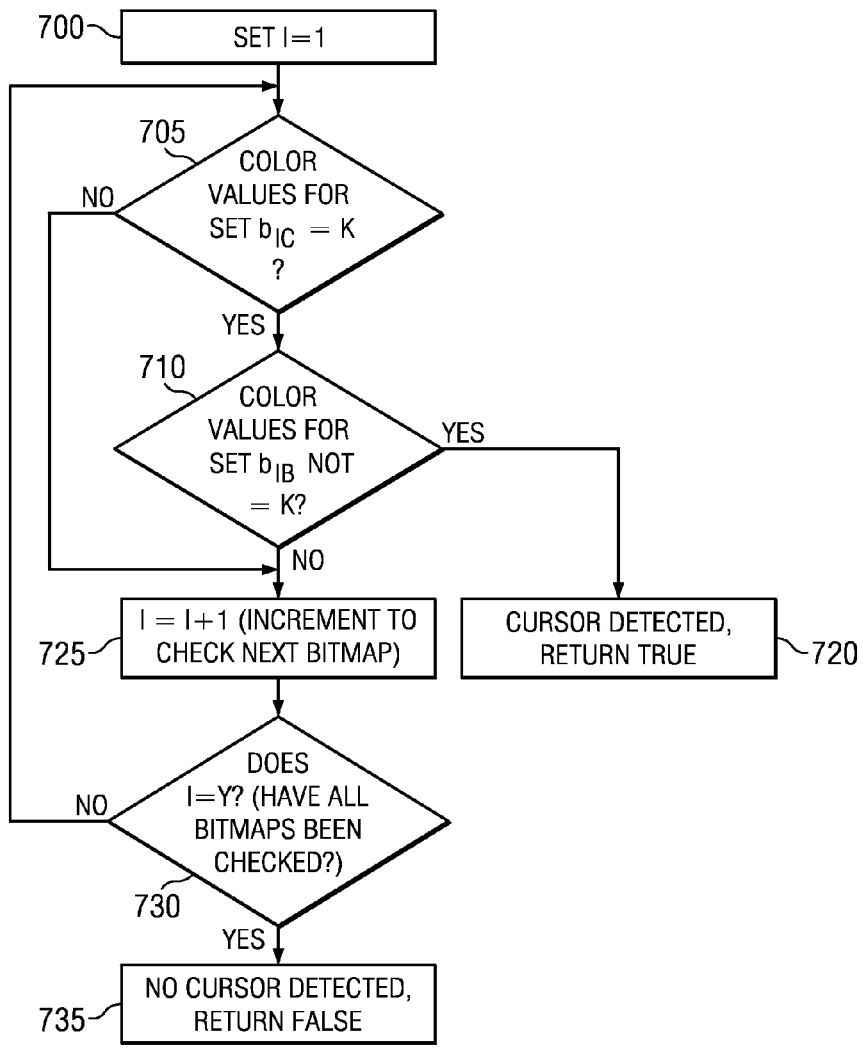
FIG. 7b illustrates a flow chart for an example method for cursor detection within frame buffer data according to an example embodiment of the present invention.

FIG. 7b illustrates a flow chart of an example method for applying the cursor template and cursor bitmaps to the frame buffer data associated with the prospective cursor rectangle, "R", to determine whether a cursor is present in the frame buffer data in accordance with the second example cursor detection algorithm. The example method associated with the second example cursor detection algorithm includes obtaining the cursor template T as described above and generating the cursor bitmaps. According to some example embodiments, the cursor bitmaps may be generated after scaling based on the dimensions of the prospective cursor rectangle.

The example method may also include setting a bitmap counter "I" to one (e.g., I=1) at 700. Next, the example method may include obtaining bitmap $b_1$, where $b_1 = b_{IC} \cup b_{IB}$, and comparing $b_I$ and R as follows. In this regard, a first pixel may be obtained from R which corresponds to a first member of the set $b_{IC}$, and the color value of the pixel may be extracted. The extracted color value may be referred to as "K."

At 705, for each member of set $b_{IC}$, the color value may be extracted and a check may be performed to determine if each color value is equal to K. According to some example embodiments, if, for the members of set $b_{IC}$, each of the color values is equal to K, then a text cursor match has been found with respect to the set $b_{IC}$, and the example method may proceed to 710.

At 710, for each member of set $b_{IB}$, the color value may be extracted and a check may be performed to determine if each color value is not equal to K. According to some example embodiments, if, for the members of set $b_{IB}$, each of the color values are not equal to K, then an indication that a cursor has been detected may be returned (e.g., return true) at 720. If a color value for a member of set $b_{IB}$ is equal to K, then the example method proceeds to 725, as described below.

If at 705, a color value for a member of set $b_{IC}$ is not equal to K, then the bitmap $b_I$ does not match R, and the bitmap counter may be incremented (I=I+1) at 725. According to some example embodiments, rather than incrementing the bitmap counter, the bitmap counter may be modified in accordance with I=(I+1) mod Y. At 730, a determination may be made as to whether the bitmap counter has reached or exceeded the number of bitmaps for the cursor template (e.g., does I=Y?). If the bitmap counter has not reached or exceeded the number of bitmaps for the cursor template, then the example method may proceed at 705 with the new value for I and another bitmap. If the bitmap counter has reached or exceeded the number of bitmaps for the cursor template, then an indication that no cursor has been detected may be returned (e.g., return false) at 735. In example embodiments where the bitmap counter was modified at 725 via I=(I+1) mod Y, a determination may be made as to whether I=0 (which indicates that all bitmaps have been checked), and if so, then the example method proceeds to 735. If not, the example method proceeds to 705.

Figure 8:
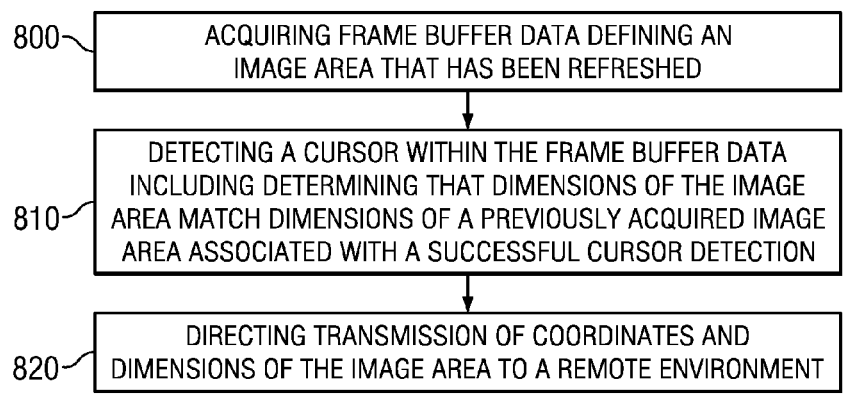
FIG. 8 illustrates flow charts of methods for determining an active input area according to an example embodiment of the present invention.

Other example methods of the present invention are described with respect to, and depicted by, FIG. 8. In this regard, an example method may include acquiring frame buffer data defining an image area that has been refreshed at 800. According to some example embodiments, acquiring the frame buffer data at 800 may include scanning buffered data associated with a single display region (e.g., the content area) to identify the frame buffer data.

An example method may also include detecting a cursor within the frame buffer data at 810. In this regard, detecting the cursor at 810 may include determining that dimensions of the image area match dimensions of a previously acquired image area associated with a successful cursor detection. Further, according to some example embodiments, detecting the cursor may also include determining that the frame buffer data matches a predefined cursor bitmap to detect the cursor. In this regard, the predefined cursor bitmap may be one of a collection of predefined cursor bitmaps that define a cursor template. Further, detecting the cursor within the frame buffer data at 810 may also include determining a color value of a given pixel defined by the frame buffer data and determining that color values of select other pixels defined by the frame buffer data match the color value of the given pixel. The select other pixels may have pixel positions corresponding to pixel positions defined by a predefined cursor bitmap. In accordance with some example embodiments, an example method may also include detecting the cursor within the frame buffer data by determining a color value of a given pixel defined by the frame buffer data and determining that color values of select other pixels defined by the frame buffer data do not match the color value of the given pixel. In this regard, the select other pixels may have pixel positions corresponding to pixel positions defined by a predefined cursor bitmap. According to some example embodiments, detecting the cursor within the frame buffer data also includes determining that the frame buffer data matches a predefined cursor bitmap, where the predefined cursor bitmap was generated from a vector description. An example method may also include directing transmission of coordinates and dimensions of the image area to a remote environment at 820.

As described herein, various example embodiments of the present invention have advantageous aspects due to the manner in which the embodiments may be implemented. Some example embodiments do not require specialized or customer hardware to perform cursor detection and determine an active text input area. Some example embodiments do not require support from the UI framework or modifications to the UI framework to perform cursor detection and determine an active text input area. Further, some example embodiments do not require specific color information about the cursor or color/pattern information for the background to perform cursor detection and determine an active text input area. Some example embodiments also minimize processing requirements during detection and are capable of handling sophisticated cursors in addition to simple flashing cursors to perform cursor detection and enable the determination of an active text input area.

Figure 9:
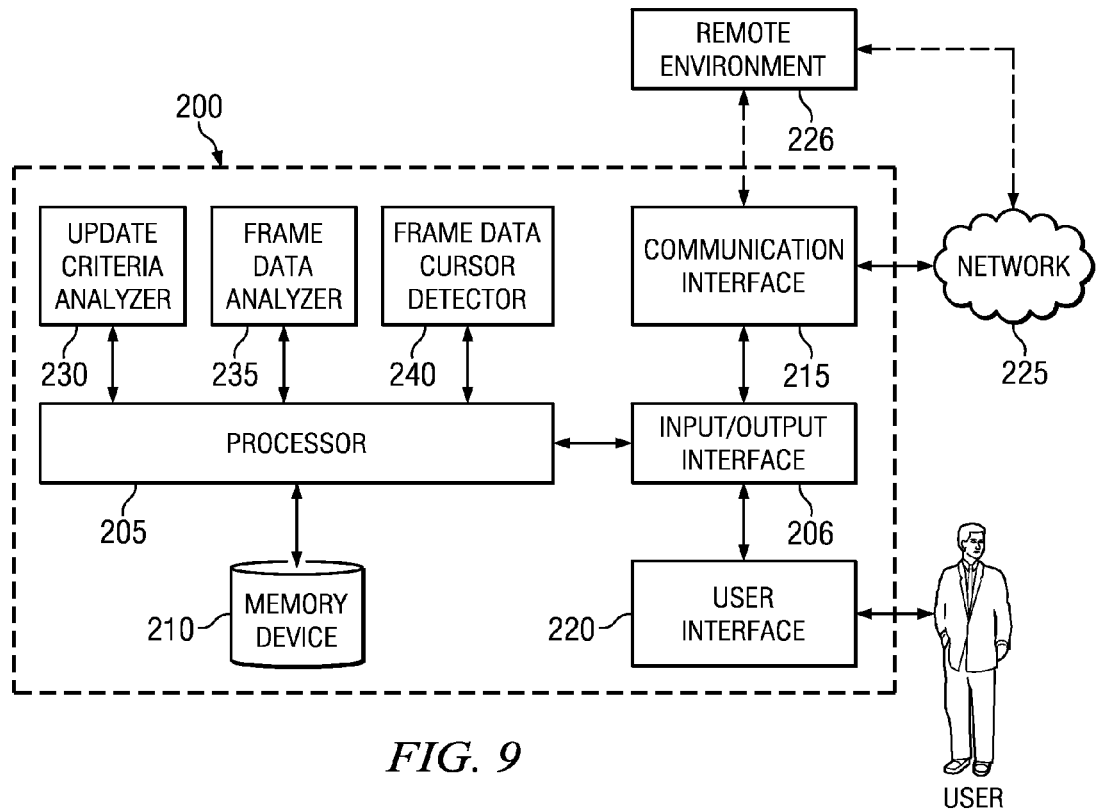
FIG. 9 illustrates a block diagram of an apparatus for display frame buffer processing and/or determining an active input area according to an example embodiment of the present invention.
Figure 10:
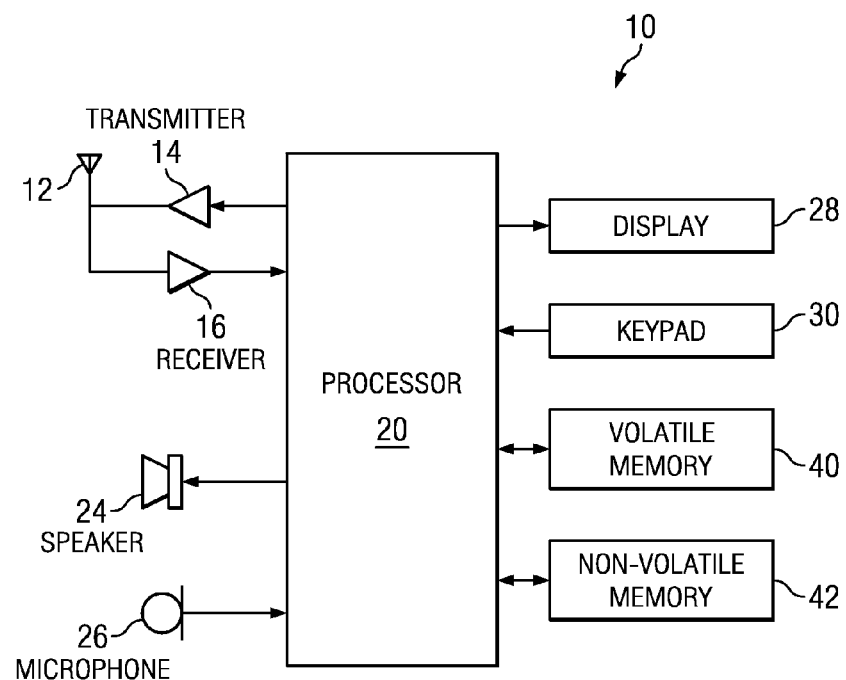
FIG. 10 illustrates a block diagram of a mobile terminal for display frame buffer processing and/or determining an active input area according to an example embodiment of the present invention.

The description provided above and generally herein illustrates example methods, example apparatuses, and example computer program products for display frame buffer processing and determining an active text input area. FIGS. 9 and 10 illustrate example apparatus embodiments of the present invention configured to perform the various functionalities described herein. FIG. 9 depicts an example apparatus that is configured to perform various functionalities from the perspective of a UE (e.g., UE 101) as described with respect to FIG. 1 and as generally described herein. FIG. 10 depicts an example UE apparatus in the form of a mobile terminal configured to perform various functionalities from the perspective of a UE 101 depicted in FIG. 1 and as generally described herein. The example apparatuses depicted in FIGS. 9 and 10 may also be configured to perform example methods of the present invention, such as those described with respect to FIGS. 4, 6, and 8.

Referring now to FIG. 9, in some example embodiments, the apparatus 200 may, be embodied as, or included as a component of, a communications device with wired or wireless communications capabilities. In this regard, the apparatus 200 may be configured to operate in accordance with the functionality of a UE as described herein. In some example embodiments, the apparatus 200 may be part of a communications device (e.g., access point 100 or UE 101), such as a stationary or a mobile terminal. As a stationary terminal, the apparatus 200 may be part of an access point (e.g., a base station, wireless router, or the like), a computer, a server, a device that supports network communications, or the like. As a mobile terminal, the apparatus 200 may be a mobile computer, mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 215, user interface 220, an update criteria analyzer 230, a frame data analyzer 235, and a frame data cursor detector 240. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms, methods, and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 215 and the user interface 220. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network 225 and/or any other device or module in communication with the example apparatus 200 (e.g., remote environment 226). In this regard, according to various example embodiments, the apparatus 200, via the communications interface 215 may either directly connect with the remote environment (e.g., via Bluetooth) or connect to the remote environment via the network 225. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols, IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 220 may be in communication with the processor 205 to receive user input via the user interface 220 and/or to present output to a user as, for example, audible, visual, mechanical or other output indications. The user interface 220 may include, for example, a keyboard, a mouse, a joystick, a display (e.g., a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The update criteria analyzer 230, the frame data analyzer 235, and/or the frame data cursor detector 240 of example apparatus 200 may be any means or device embodied, partially or wholly, in hardware, a computer program product, or a combination of hardware and a computer program product, such as processor 205 implementing stored instructions to configure the example apparatus 200, memory device 210 storing executable program code instructions configured to carry out the functions described herein, or a hardware configured processor 205 that is configured to carry out the functions of the update criteria analyzer 230, the frame data analyzer 235, and/or the frame data cursor detector 240 as described herein. In an example embodiment, the processor 205 includes, or controls, the update criteria analyzer 230, the frame data analyzer 235, and/or the frame data cursor detector 240. The update criteria analyzer 230, the frame data analyzer 235, and/or the frame data cursor detector 240 may be, partially or wholly, embodied as processors similar to, but separate from processor 205. In this regard, the update criteria analyzer 230, the frame data analyzer 235, and/or the frame data cursor detector 240 may be in communication with the processor 205. In various example embodiments, the update criteria analyzer 230, the frame data analyzer 235, and/or the frame data cursor detector 240 may, partially or wholly, reside on differing apparatuses such that some or all of the functionality of the update criteria analyzer 230, the frame data analyzer 235, and/or the frame data cursor detector 240 may be performed by a first apparatus, and the remainder of the functionality of the update criteria analyzer 230, the frame data analyzer 235, and/or the frame data cursor detector 240 may be performed by one or more other apparatuses.

The apparatus 200 and the processor 205 may be configured to perform the following functionality via the update criteria analyzer 230. In this regard, the update criteria analyzer 230 may be configured to determine that update criteria associated with a display region has been satisfied. In this regard, the display region is less than an entire area of a display. According to some example embodiments, the update criteria and a description of an area of the display region may be stored as meta-data, possibly for an associated application. In this regard, the meta-data may be stored in the memory device 210.

The update criteria may take a number of forms and may be satisfied in a manner associated with the form. For example, according to some example embodiments, the update criteria for a display region may be satisfied when a timer threshold has been passed. Additionally, or alternatively, according to some example embodiments, the update criteria for a display region may be satisfied when user input has been received via a user interface. Additionally, or alternatively, according to some example embodiments, the update criteria for a display region may be satisfied when a context of an application associated with the current frame buffer data has changed. Additionally, or alternatively, according to some example embodiments, the update criteria for a display region may be satisfied when frame buffer data changes associated with another display region have occurred.

The apparatus 200 and the processor 205 may be configured to perform the following functionality via the frame data analyzer 235. In this regard, the schedule analyzer 235 may be configured to compare current frame buffer data for the display region to subsequent frame buffer data for the display region to determine frame buffer data changes associated with the display region. The current frame buffer data and/or the subsequent frame buffer data may be stored in a frame buffer included within memory device 210. According to some example embodiments, the comparing performed by the frame data analyzer 235 may be performed in response to the update criteria being satisfied. Further, according to some example embodiments, the frame data analyzer 235 may be configured to facilitate presentation of the frame buffer data changes within a display region on a display. In this regard, the display may be a display of the user interface 220, or the display may be a remote display (e.g., remote environment 100).

The apparatus 200 and the processor 205 may be configured to perform the following functionality via the frame data cursor detector 240. In this regard, the frame data cursor detector 240 may be configured to acquire frame buffer data defining an image area that has been refreshed and detect a cursor within the frame buffer data. Being configured to detect the cursor may include being configured to determine that dimensions of the image area match dimensions of a previously acquired image area associated with a successful cursor detection. The frame data cursor detector 240 may also be configured to direct transmission of coordinates and dimensions of the image area to a remote environment.

According to some example embodiments, the frame data cursor detector 240 may be configured to acquire the frame buffer data by scanning buffered data associated with a single display region (e.g., the content area) to identify the frame buffer data. Further, according to some example embodiments, the frame data cursor detector 240 may also be configured to determine that the frame buffer data matches a predefined cursor bitmap to detect the cursor. In this regard, the predefined cursor bitmap may be one of a collection of predefined cursor bitmaps that define a cursor template. Further, being configured to detect the cursor within the frame buffer data may also include being configured to determine a color value of a given pixel defined by the frame buffer data and determine that color values of select other pixels defined by the frame buffer data match the color value of the given pixel. The select other pixels may have pixel positions corresponding to pixel positions defined by a predefined cursor bitmap. In accordance with some example embodiments, the frame data cursor detector 240 may also be configured to detect the cursor within the frame buffer data by determining a color value of a given pixel defined by the frame buffer data and determining that color values of select other pixels defined by the frame buffer data do not match the color value of the given pixel. In this regard, the select other pixels may have pixel positions corresponding to pixel positions defined by a predefined cursor bitmap. According to some example embodiments, frame data cursor detector 240 may be configured to detect the cursor within the frame buffer data by determining that the frame buffer data matches a predefined cursor bitmap, where the predefined cursor bitmap was generated from a vector description. The frame data cursor detector 240 may also be configured to, according to some example embodiments, directing transmission of position information for an active text input area to the remote environment.

Referring now to FIG. 10, a more specific example apparatus in accordance with various embodiments of the present invention is provided. The example apparatus of FIG. 10 is a mobile terminal 10 configured to communicate within a wireless network, such as a cellular communications network. The mobile terminal 10 may be configured to perform the functionality of UE 101 and/or apparatus 200 as described herein. More specifically, the mobile terminal 10 may be caused to perform the functionality of the update criteria analyzer 230, the frame data analyzer 235, and/or the frame data cursor detector 240 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may further include an antenna 12, a transmitter 14, and a receiver 16, which may be included as parts of a communications interface of the mobile terminal 10. The speaker 24, the microphone 26, the display 28, and the keypad 30 may be included as parts of a user interface.

FIGS. 4, 6, 7b, and 8 illustrate flowcharts of example systems, methods, and/or computer program products according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Additional example embodiments of the present invention are described as follows. An example method comprises acquiring frame buffer data defining an image area that has been refreshed; detecting a cursor within the frame buffer data, wherein detecting the cursor includes determining that dimensions of the image area match dimensions of a previously acquired image area associated with a successful cursor detection; and directing transmission of coordinates and dimensions of the image area to a remote environment. According to some example embodiments, acquiring the frame buffer data includes scanning buffered data associated with a single display region to identify the frame buffer data. According to some example embodiments, detecting the cursor within the frame buffer data includes determining that the frame buffer data matches a predefined cursor bitmap, the predefined cursor bitmap being one of a collection of predefined cursor bitmaps that define a cursor template. According to some example embodiments, detecting the cursor within the frame buffer data includes determining a color value of a given pixel defined by the frame buffer data: and determining that color values of select other pixels defined by the frame buffer data match the color value of the given pixel, the select other pixels having pixel positions corresponding to pixel positions defined by a predefined cursor bitmap. According to some example embodiments, detecting the cursor within the frame buffer data includes determining a color value of a given pixel defined by the frame buffer data: and determining that color values of select other pixels defined by the frame buffer data do not match the color value of the given pixel, the select other pixels having pixel positions corresponding to pixel positions defined by a predefined cursor bitmap. According to some example embodiments, detecting the cursor within the frame buffer data includes determining that the frame buffer data matches a predefined cursor bitmap, the predefined cursor bitmap having been generated from a vector description. According to some example embodiments, directing transmission of coordinates and dimensions of the image area includes directing transmission of position information for an active text input area to the remote environment.

Another example embodiment is an apparatus comprising at least one processor and at least one memory including computer program code, the at least one memory and the computer program code configured to, with the at least one processor, cause the apparatus at least to perform acquiring frame buffer data defining an image area that has been refreshed; detecting a cursor within the frame buffer data, wherein the apparatus caused to perform detecting the cursor includes being caused perform determining that dimensions of the image area match dimensions of a previously acquired image area associated with a successful cursor detection; and directing transmission of coordinates and dimensions of the image area to a remote environment. According to some example embodiments, the apparatus caused to perform acquiring the frame buffer data includes being caused to perform scanning buffered data associated with a single display region to identify the frame buffer data. According to some example embodiments, the apparatus caused to perform detecting the cursor within the frame buffer data includes being caused to perform determining that the frame buffer data matches a predefined cursor bitmap, the predefined cursor bitmap being one of a collection of predefined cursor bitmaps that define a cursor template. According to some example embodiments, the apparatus caused to perform detecting the cursor within the frame buffer data includes being caused to perform determining a color value of a given pixel defined by the frame buffer data: and determining that color values of select other pixels defined by the frame buffer data match the color value of the given pixel, the select other pixels having pixel positions corresponding to pixel positions defined by a predefined cursor bitmap. According to some example embodiments, the apparatus caused to perform detecting the cursor within the frame buffer data includes being caused to perform determining a color value of a given pixel defined by the frame buffer data: and determining that color values of select other pixels defined by the frame buffer data do not match the color value of the given pixel, the select other pixels having pixel positions corresponding to pixel positions defined by a predefined cursor bitmap. According to some example embodiments, the apparatus caused to perform detecting the cursor within the frame buffer data includes being caused to perform determining that the frame buffer data matches a predefined cursor bitmap, the predefined cursor bitmap having been generated from a vector description. According to some example embodiments, the apparatus caused to perform directing transmission of coordinates and dimensions of the image area includes being caused to perform directing transmission of position information for an active text input area to the remote environment. According to some example embodiments, the apparatus comprises a mobile terminal; and wherein the apparatus further comprises user interface circuitry and user interface software configured to facilitate user control of at least some functions of the mobile terminal through the use of a display and configured to respond to user inputs, and a display and display circuitry configured to display at least a portion of a user interface of the mobile terminal, the display and the display circuitry configured to facilitate user control of at least some functions of the mobile terminal. According to some example embodiments, the apparatus further comprises a communications interface configured to transmit information to the remote environment.

Another example embodiment of the present invention is a computer-readable storage medium having executable computer-readable program code instructions stored therein, the instructions for causing an apparatus to perform acquiring frame buffer data defining an image area that has been refreshed; detecting a cursor within the frame buffer data, wherein the instructions for causing an apparatus to perform detecting the cursor include the instructions for causing an apparatus to perform determining that dimensions of the image area match dimensions of a previously acquired image area associated with a successful cursor detection; and directing transmission of coordinates and dimensions of the image area to a remote environment. According to some example embodiments, the instructions for causing an apparatus to perform acquiring the frame buffer data include instructions for causing an apparatus to perform scanning buffered data associated with a single display region to identify the frame buffer data. According to some example embodiments, the instructions for causing an apparatus to perform detecting the cursor within the frame buffer data include instructions for causing an apparatus to perform determining that the frame buffer data matches a predefined cursor bitmap, the predefined cursor bitmap being one of a collection of predefined cursor bitmaps that define a cursor template. According to some example embodiments, the instructions for causing an apparatus to perform detecting the cursor within the frame buffer data include instructions for causing an apparatus to perform determining a color value of a given pixel defined by the frame buffer data: and determining that color values of select other pixels defined by the frame buffer data match the color value of the given pixel, the select other pixels having pixel positions corresponding to pixel positions defined by a predefined cursor bitmap. According to some example embodiments, the instructions for causing an apparatus to perform detecting the cursor within the frame buffer data include instructions for causing an apparatus to perform determining a color value of a given pixel defined by the frame buffer data: and determining that color values of select other pixels defined by the frame buffer data do not match the color value of the given pixel, the select other pixels having pixel positions corresponding to pixel positions defined by a predefined cursor bitmap. According to some example embodiments, the instructions for causing an apparatus to perform detecting the cursor within the frame buffer data include instructions for causing an apparatus to perform determining that the frame buffer data matches a predefined cursor bitmap, the predefined cursor bitmap having been generated from a vector description. According to some example embodiments, the instructions for causing an apparatus to perform directing transmission of coordinates and dimensions of the image area include instructions for causing an apparatus to perform directing transmission of position information for an active text input area to the remote environment.

Yet another example embodiment is an apparatus comprising means for acquiring frame buffer data defining an image area that has been refreshed; means for detecting a cursor within the frame buffer data, wherein means for detecting the cursor includes determining that dimensions of the image area match dimensions of a previously acquired image area associated with a successful cursor detection; and means for directing transmission of coordinates and dimensions of the image area to a remote environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. A method comprising:
acquiring frame buffer data defining an image area that has been refreshed;
detecting a cursor indicating an active input area within the frame buffer data, wherein detecting the cursor includes determining that dimensions of the image area match dimensions of a previously acquired image area associated with a successful cursor detection; and
directing transmission of coordinates and dimensions of the image area to a remote environment, wherein the transmitted coordinates and dimensions of the image area comprise an active text input area.

2. The method of claim 1, wherein acquiring the frame buffer data includes scanning buffered data associated with a single display region to identify the frame buffer data.

3. The method of claim 1, wherein detecting the cursor within the frame buffer data includes determining that the frame buffer data matches a predefined cursor bitmap, the predefined cursor bitmap being one of a collection of predefined cursor bitmaps that define a cursor template.

4. The method of claim 1, wherein detecting the cursor within the frame buffer data includes:
determining a color value of a given pixel defined by the frame buffer data; and
determining that color values of select other pixels defined by the frame buffer data match the color value of the given pixel, the select other pixels having pixel positions corresponding to pixel positions defined by a predefined cursor bitmap.

5. The method of claim 1, wherein detecting the cursor within the frame buffer data includes:
determining a color value of a given pixel defined by the frame buffer data; and
determining that color values of select other pixels defined by the frame buffer data do not match the color value of the given pixel, the select other pixels having pixel positions corresponding to pixel positions defined by a predefined cursor bitmap.

6. The method of claim 1, wherein detecting the cursor within the frame buffer data includes determining that the frame buffer data matches a predefined cursor bitmap, the predefined cursor bitmap having been generated from a vector description.

7. The method of claim 1, wherein directing transmission of coordinates and dimensions of the image area includes directing transmission of position information for an active text input area to the remote environment.

8. An apparatus comprising at least one processor and at least one memory including computer program code, the at least one memory and the computer program code configured to, with the at least one processor, cause the apparatus at least to:
acquire frame buffer data defining an image area that has been refreshed;
detect a cursor indicating an active input area within the frame buffer data, wherein the apparatus caused to detect the cursor includes being caused to determine that dimensions of the image area match dimensions of a previously acquired image area associated with a successful cursor detection; and
direct transmission of coordinates and dimensions of the image area to a remote environment, wherein the transmitted coordinates and dimensions of the image area comprise an active text input area.

9. The apparatus of claim 8, wherein the apparatus caused to acquire the frame buffer data includes being caused to scan buffered data associated with a single display region to identify the frame buffer data.

10. The apparatus of claim 8, wherein the apparatus caused to detect the cursor within the frame buffer data includes being caused to determine that the frame buffer data matches a predefined cursor bitmap, the predefined cursor bitmap being one of a collection of predefined cursor bitmaps that define a cursor template.

11. The apparatus of claim 8, wherein the apparatus caused to detect the cursor within the frame buffer data includes being caused to:
determine a color value of a given pixel defined by the frame buffer data; and
determine that color values of select other pixels defined by the frame buffer data match the color value of the given pixel, the select other pixels having pixel positions corresponding to pixel positions defined by a predefined cursor bitmap.

12. The apparatus of claim 8, wherein the apparatus caused to detect the cursor within the frame buffer data includes being caused to:
determine a color value of a given pixel defined by the frame buffer data; and
determine that color values of select other pixels defined by the frame buffer data do not match the color value of the given pixel, the select other pixels having pixel positions corresponding to pixel positions defined by a predefined cursor bitmap.

13. The apparatus of claim 8, wherein the apparatus caused to detect the cursor within the frame buffer data includes being caused to determine that the frame buffer data matches a predefined cursor bitmap, the predefined cursor bitmap having been generated from a vector description.

14. The apparatus of claim 8, wherein the apparatus caused to direct transmission of coordinates and dimensions of the image area includes being caused to direct transmission of position information for an active text input area to the remote environment.

15. The apparatus of claim 8, wherein the apparatus comprises a mobile terminal; and wherein the apparatus further comprises user interface circuitry and user interface software configured to facilitate user control of at least some functions of the mobile terminal through the use of a display and configured to respond to user inputs, and a display and display circuitry configured to display at least a portion of a user interface of the mobile terminal, the display and the display circuitry configured to facilitate user control of at least some functions of the mobile terminal.

16. The apparatus of claim 8 further comprising a communications interface configured to transmit information to the remote environment.

17. A computer-readable storage medium having executable computer-readable program code instructions stored therein, the instructions for causing an apparatus to:
acquire frame buffer data defining an image area that has been refreshed;
detect a cursor indicating an active input area within the frame buffer data, wherein the instructions for causing the apparatus to detect the cursor include the instructions for causing the apparatus to determine that dimensions of the image area match dimensions of a previously acquired image area associated with a successful cursor detection; and
direct transmission of coordinates and dimensions of the image area to a remote environment, wherein the transmitted coordinates and dimensions of the image area comprise an active text input area.

18. The computer-readable storage medium of claim 17, wherein the instructions for causing the apparatus to acquire the frame buffer data include instructions for causing the apparatus to scan buffered data associated with a single display region to identify the frame buffer data.

19. The computer-readable storage medium of claim 17, wherein the instructions for causing the apparatus to detect the cursor within the frame buffer data include instructions for causing the apparatus to determine that the frame buffer data matches a predefined cursor bitmap, the predefined cursor bitmap being one of a collection of predefined cursor bitmaps that define a cursor template.

20. The computer-readable storage medium of claim 17, wherein the instructions for causing the apparatus to detect the cursor within the frame buffer data include instructions for causing the apparatus to:
   determine a color value of a given pixel defined by the frame buffer data; and
   determine that color values of select other pixels defined by the frame buffer data match the color value of the given pixel, the select other pixels having pixel positions corresponding to pixel positions defined by a predefined cursor bitmap.

21. The computer-readable storage medium of claim 17, wherein the instructions for causing the apparatus to detect the cursor within the frame buffer data include instructions for causing the apparatus to:
   determine a color value of a given pixel defined by the frame buffer data; and
   determine that color values of select other pixels defined by the frame buffer data do not match the color value of the given pixel, the select other pixels having pixel positions corresponding to pixel positions defined by a predefined cursor bitmap.

22. The computer-readable storage medium of claim 17, wherein the instructions for causing the apparatus to detect the cursor within the frame buffer data include instructions for causing the apparatus to determine that the frame buffer data matches a predefined cursor bitmap, the predefined cursor bitmap having been generated from a vector description.

23. The computer-readable storage medium of claim 17, wherein the instructions for causing the apparatus to direct transmission of coordinates and dimensions of the image area include instructions for causing the apparatus to direct transmission of position information for an active text input area to the remote environment.

24. An apparatus comprising:
   means for acquiring frame buffer data defining an image area that has been refreshed;
   means for detecting a cursor indicating an active input area within the frame buffer data, wherein means for detecting the cursor includes determining that dimensions of the image area match dimensions of a previously acquired image area associated with a successful cursor detection; and
   means for directing transmission of coordinates and dimensions of the image area to a remote environment, wherein the transmitted coordinates and dimensions of the image area comprise an active text input area.

* * * * *